United States Patent
Mega et al.

(10) Patent No.: US 8,720,056 B2
(45) Date of Patent: May 13, 2014

(54) TURBINE ROTOR BLADE REPAIR METHOD

(75) Inventors: Masahiko Mega, Takasago (JP); Kei Osawa, Takasago (JP); Masahiko Onda, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 531 days.

(21) Appl. No.: 12/670,311

(22) PCT Filed: Feb. 9, 2009

(86) PCT No.: PCT/JP2009/052133
§ 371 (c)(1),
(2), (4) Date: Mar. 26, 2010

(87) PCT Pub. No.: WO2009/101912
PCT Pub. Date: Aug. 20, 2009

(65) Prior Publication Data
US 2010/0205805 A1    Aug. 19, 2010

(30) Foreign Application Priority Data

Feb. 14, 2008 (JP) .................. 2008-032648

(51) Int. Cl.
*B23P 6/04* (2006.01)
(52) U.S. Cl.
USPC ............... 29/889.1; 29/402.07; 29/402.18
(58) Field of Classification Search
USPC .................. 29/889.1, 402.07, 402.18
See application file for complete search history.

(56) References Cited

U.S. PATENT DOCUMENTS

| | | | |
|---|---|---|---|
| 5,033,938 A * | 7/1991 | Fraser et al. | 416/224 |
| 5,092,942 A * | 3/1992 | Fraser et al. | 148/529 |
| 6,238,187 B1 | 5/2001 | Dulaney et al. | |
| 7,836,594 B2 * | 11/2010 | Rose | 29/889.1 |
| 2002/0037219 A1 * | 3/2002 | Webster et al. | 416/223 R |
| 2002/0076573 A1 * | 6/2002 | Neal et al. | 428/621 |
| 2005/0263220 A1 | 12/2005 | Malley et al. | |
| 2006/0157165 A1 * | 7/2006 | Kottilingam et al. | 148/525 |
| 2006/0168808 A1 * | 8/2006 | Lin et al. | 29/889.1 |
| 2006/0277753 A1 * | 12/2006 | Ntsama-Etoundi et al. | 29/889.1 |
| 2007/0151100 A1 * | 7/2007 | Thamboo et al. | 29/889.23 |
| 2007/0186416 A1 | 8/2007 | Birkner et al. | |
| 2009/0269208 A1 * | 10/2009 | Szela et al. | 416/241 R |
| 2009/0282678 A1 * | 11/2009 | Williams et al. | 29/889.1 |

FOREIGN PATENT DOCUMENTS

| | | |
|---|---|---|
| CN | 1962172 A | 5/2007 |
| CN | 101121216 A | 2/2008 |
| EP | 1138431 A2 | 10/2001 |
| EP | 1602442 A1 | 12/2005 |

(Continued)

OTHER PUBLICATIONS

Machine Translation of JP 10-080767.*

(Continued)

*Primary Examiner* — Alexander P Taousakis
(74) *Attorney, Agent, or Firm* — Westerman, Hattori, Daniels & Adrian, LLP

(57) ABSTRACT

A turbine rotor blade repair method which reduces the occurrence of cracks due to welding is provided. A turbine rotor blade repair method for repairing damage of a fin at a tip of a turbine rotor blade includes overlaying a damaged portion of the fin with metal by welding (step S2); peening on a boundary region between the fin and the overlaying metal (step S4); and after the peening, performing solution treatment to repair the damage of the fin of the turbine rotor blade (step S6).

10 Claims, 7 Drawing Sheets

(56) References Cited

FOREIGN PATENT DOCUMENTS

| | | | |
|---|---|---|---|
| EP | 1607169 | A1 | 12/2005 |
| JP | 5-237656 | A | 9/1993 |
| JP | 6-288549 | A | 10/1994 |
| JP | 7-214313 | A | 8/1995 |
| JP | 8-174215 | A | 7/1996 |
| JP | 9-10985 | A | 1/1997 |
| JP | 10-80767 | A | 3/1998 |
| JP | 11-256271 | A | 9/1999 |
| JP | 2006-15408 | A | 1/2006 |
| KR | 1997-0010894 | B1 | 10/1989 |

OTHER PUBLICATIONS

Korean Office Action dated Sep. 9, 2011, issued in corresponding Korean Patent Application No. 10-2010-7003215.

International Search Report of PCT/JP2009/052133, mailing date of Mar. 17, 2009.

Chinese Office Action dated May 3, 2012, issued in corresponding Chinese Patent Application No. 200980100135.2, with English translation (8 pages).

Supplementary European Search Report dated Jan. 31, 2012, issued in corresponding European Patent Application No. 09709476.7.

* cited by examiner

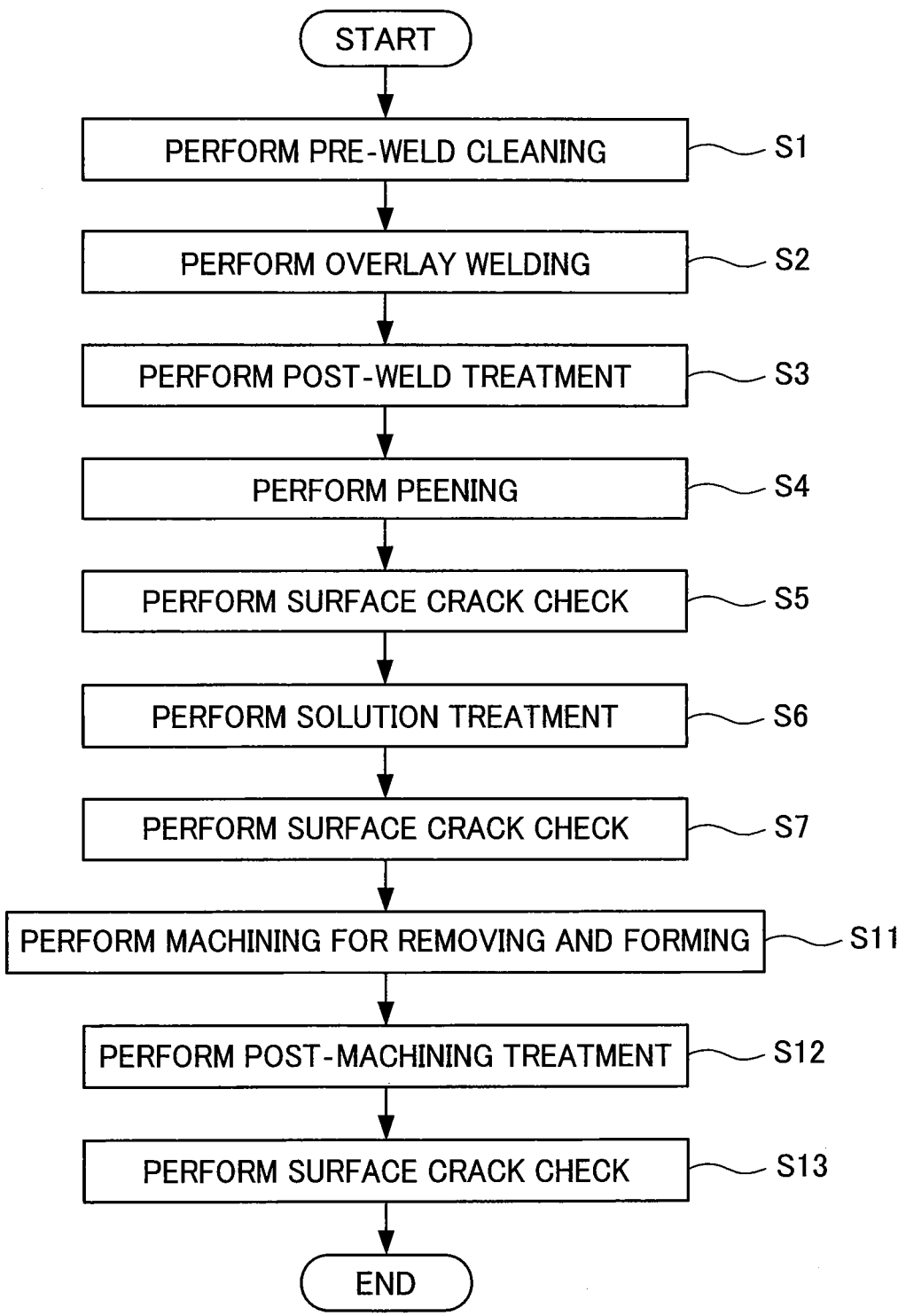

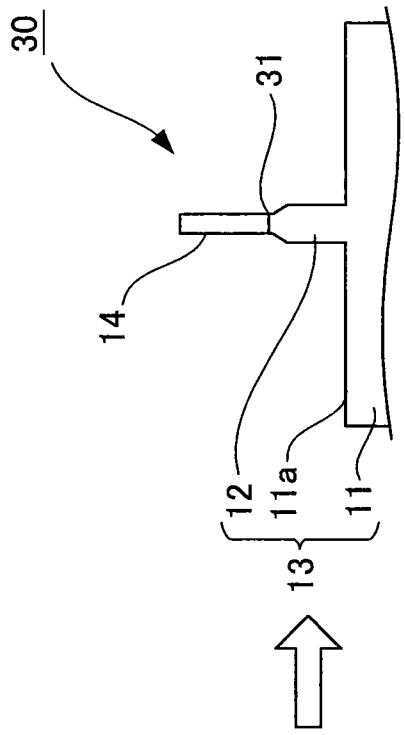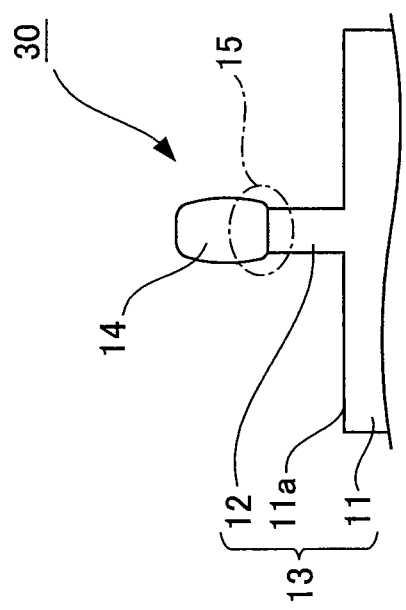

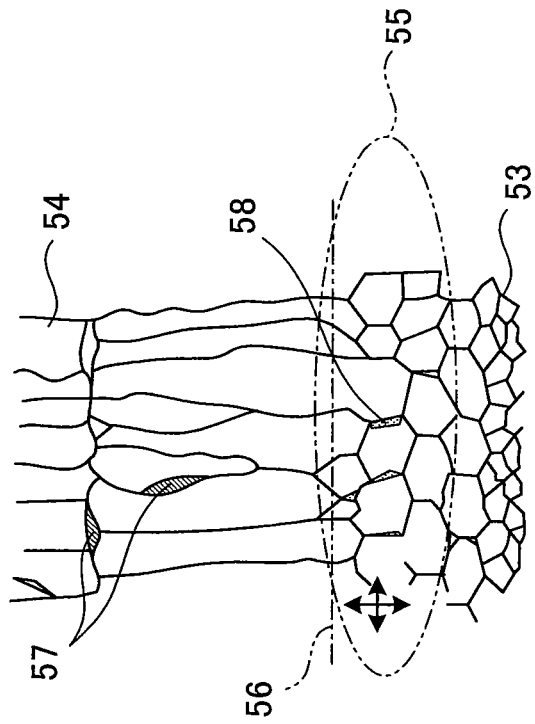
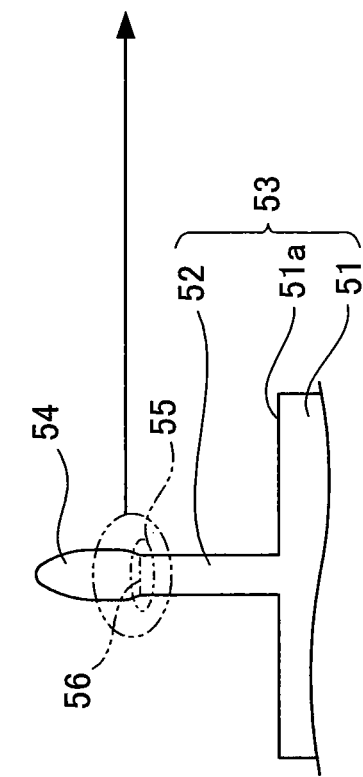
Fig.8(a)
Fig.8(b)

Fig. 9
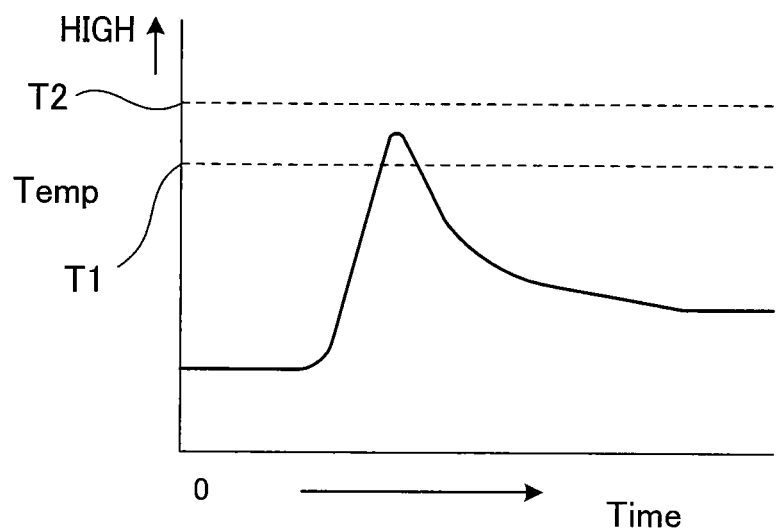
Fig. 10(a)　　Fig. 10(b)
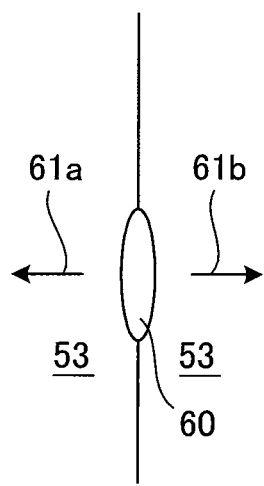
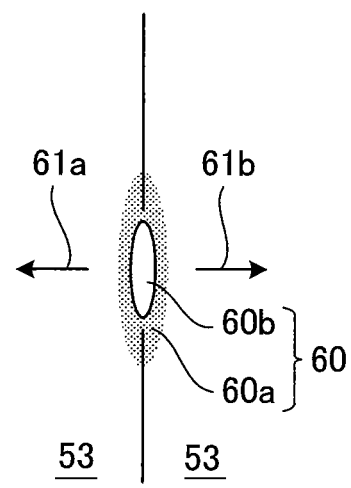

TURBINE ROTOR BLADE REPAIR METHOD

TECHNICAL FIELD

The present invention relates to a turbine rotor blade repair method, and is particularly effective when applied to repairing a rotor blade of a gas turbine for power generation.

BACKGROUND ART

In a turbine, a plurality of disks are disposed in the axial direction of a rotary shaft. In the peripheries of these disks, a large number of turbine rotor blades are implanted adjacent to each other in the circumferential direction. Between the turbine rotor blades adjacent to each other in the axial direction, stator blades are disposed which are provided in a casing covering the outside of the turbine rotor blades. Passing high-temperature combustion gas between the turbine rotor and stator blades rotationally drives the turbine rotor blades and the rotary shaft to drive, for example, a compressor and a generator.

On the side of the casing outside the rotor blades, a component is disposed which determines the clearance to the tips of the rotor blades. This component is often formed of a wear-prone honeycomb or coated with a special scratch-prone coating so that even if the component comes into contact with rotor blades due to causes such as an error in clearance control, damage to the rotor blades may be minimized.

If the clearance is large, gas leaks out through the clearance to decrease the efficiency of the turbine. Accordingly, ideally, the smaller clearance is the better. On the other hand, reducing the clearance increases the risk of the above-described contact with the component. However, in recent years, there has been a growing demand for clearances made as small as possible in relation to an increasing need for efficiency improvement. Accordingly, the risk of the above-described contact is inevitably increasing.

Examples of the above-described turbine rotor blade include, for example, a turbine rotor blade 50 having a fin 52 provided at a tip 51a of a blade portion 51 as shown in FIG. 6 (upper end portion of the blade portion 51 in FIG. 6). By providing the fin 52 at the tip 51a of the blade portion 51 as described above, the clearance between the turbine rotor blade 50 and the aforementioned component on the casing side is adjusted to be as small as possible.

Since turbine rotor blades are subjected to a high temperature environment as described previously, there are cases where a fin is damaged by aged deterioration such as oxidation or by contact with the casing-side component due to thermal expansion during operation. In such a case, as shown in FIG. 7, the fin is repaired by overlaying base material 53 with weld material 42 supplied in the form of a wire by welding using a welding heat source 41 (e.g., see Patent Literature 1). At this time, the base material 53 is overlaid with weld metal 54 by welding. The base material 53 is melted in a region above a fusion boundary 56 by the heat from the welding heat source 41, and becomes a heat-affected zone 55 affected by the heat in a region under the fusion boundary 56.

Patent Literature 1: JP-A-Hei-10-80767

DISCLOSURE OF INVENTION

Problems to be Solved by the Invention

Turbine rotor blades are manufactured using nickel-base superalloys which are $\gamma'$ ($Ni_3$ (Al,Ti)) strengthened superalloys. In general, aluminum and titanium contained in nickel-base superalloys are said to increase hot crack sensitivity during welding. Accordingly, the occurrence of hot cracks during welding increases with increase in contents of Al and Ti, i.e., increase in amount of $\gamma'$.

On the other hand, in general, fin portions are tip portions, and therefore need not have as much strength as blade bodies in many cases. In such cases, when a fin of a turbine rotor blade is repaired, the repair is sometimes performed by overlay welding using a weld material which is different from a base material and which has weldability improved by reducing the contents of Al and Ti at the slight expense of strength. In many cases, cracks (solidification cracks 57 in FIGS. 8(a) and 8(b)) in weld metal itself can be avoided by improving weldability on the weld material side as described above.

On the other hand, welding the weld metal 54 to the base material 53 with high contents of aluminum and titanium, which are unsuitable for welding at high contents, is apt to cause liquation cracks 58 in the vicinity of the heat-affected zone 55 as shown in FIGS. 8(a) and 8(b). The liquation cracking is said to occur as follows: metal carbides existing in a grain boundary form an eutectic with base material, compounds having low melting points (low-melting-point compounds) are liquefied, and tension occurs in the liquefied grain boundary due to thermal stresses, intragranular volume shrinkage at the time of $\gamma'$ precipitation, and the like. In other words, when the boundary region between a fin and overlaying metal heated to a high temperature by welding is cooled down, a nickel-base superalloy gradually solidifies from the periphery thereof, and low-melting-point compounds solidifies in a central portion thereof at last. Accordingly, tensile stresses are concentrated in a liquefied region of the aforementioned fusion boundary region, and if the magnitudes thereof are large, cracks (high-temperature cracks) occur. It should be noted, however, that in many cases, liquation cracking is within an allowable defect range in a low-constraint portion such as a fin portion.

Further, after overlay welding, solution treatment is performed to increase the strength of a welded portion. This treatment is performed to increase the strength of a turbine rotor blade by precipitating a gamma prime phase evenly over the entire turbine rotor blade. In the course of heating the turbine rotor blade by this solution treatment, low-melting-point compounds in the boundary region between a fin and overlaying metal melt earlier than a nickel-base alloy around the low-melting-point compounds, and cracks sometimes occur due to the effects of the aforementioned tensile stresses. Such cracks can be said to be a kind of reheat crack.

The mechanism of occurrence of such cracks is estimated, for example, as shown in FIGS. 9 to 10(b). It should be noted that in FIGS. 10(a) and 10(b), arrows indicate the magnitudes of tensile residual stresses. As shown in FIG. 10(a), precipitates (carbides and the like) 60 which form an eutectic with base material to produce low-melting-point compounds exist between base material 53 and base material 53. At this time, tensile residual stresses 61a and 61b caused by welding have certain magnitudes. In general, it is widely accepted that residual stresses after welding have magnitudes approximately equal to that of the yield stress of material. Then, solution treatment is performed on the gas turbine rotor blade. Specifically, as shown in FIG. 9, the turbine rotor blade is heated to a temperature higher than T1 (=the liquefaction temperature of the boundary) and lower than melting point T2 of the base material 53. At this time, as shown in FIG. 10(b), liquefaction occurs in the vicinity of the periphery of a region 60b where the precipitates 60 are unreacted, thus producing a liquefied region 60a. At this time, the material does not become relaxed, and the tensile residual stresses 61a and 61b have the same magnitudes as before the solution treatment.

Accordingly, crack sensitivity can be lowered in a weld metal portion by using material less prone to cause cracks as the weld metal. It is also expected that liquation cracking can be reduced in a low-constraint portion such as a fin portion to damage within an allowable defect range by devising processing conditions. However, it has been difficult to reduce reheat cracks in a heat-affected zone during heat treatment.

The present invention has been proposed in view of the above-described problems, and an object of the present invention is to provide a turbine rotor blade repair method which reduces the occurrence of cracks due to welding.

Means for Solving the Problems

A turbine rotor blade repair method according to a first invention for solving the aforementioned problems is a turbine rotor blade repair method for repairing damage of a fin at a tip of a turbine rotor blade, characterized by comprising: overlaying a damaged portion of the fin with metal by welding; peening a boundary region between the fin and the overlaying metal; and thereafter performing solution treatment to repair the damage of the fin of the turbine rotor blade.

A turbine rotor blade repair method according to a second invention for solving the aforementioned problems is the turbine rotor blade repair method according to the first invention, characterized in that the peening is performed by a peening hammer.

A turbine rotor blade repair method according to a third invention for solving the aforementioned problems is the turbine rotor blade repair method according to any one of the first and second inventions, characterized in that the peening is performed in both side portions of the boundary region between the fin and the overlaying metal.

A turbine rotor blade repair method according to a fourth invention for solving the aforementioned problems is the turbine rotor blade repair method according to any one of the first and second inventions, characterized in that after the solution treatment is performed on the boundary region between the fin and the overlaying metal, removing machining is performed to remove part of the boundary region.

A turbine rotor blade repair method according to a fifth invention for solving the aforementioned problems is the turbine rotor blade repair method according to the third invention, characterized in that after the solution treatment is performed on the boundary region between the fin and the overlaying metal, removing machining is performed to remove part of the boundary region.

A turbine rotor blade repair method according to a sixth invention for solving the aforementioned problems is the turbine rotor blade repair method according to the fourth invention, characterized in that the removing machining is electro-discharge machining.

A turbine rotor blade repair method according to a seventh invention for solving the aforementioned problems is the turbine rotor blade repair method according to the fifth invention, characterized in that the removing machining is electro-discharge machining.

A turbine rotor blade repair method according to an eighth invention for solving the aforementioned problems is the turbine rotor blade repair method according to any one of the first and second inventions, characterized in that the fin of the turbine rotor blade is a flat fin.

A turbine rotor blade repair method according to a ninth invention for solving the aforementioned problems is the turbine rotor blade repair method according to the third invention, characterized in that the fin of the turbine rotor blade is a flat fin.

A turbine rotor blade repair method according to a tenth invention for solving the aforementioned problems is the turbine rotor blade repair method according to the fourth invention, characterized in that the fin of the turbine rotor blade is a flat fin.

A turbine rotor blade repair method according to an eleventh invention for solving the aforementioned problems is the turbine rotor blade repair method according to the fifth invention, characterized in that the fin of the turbine rotor blade is a flat fin.

A turbine rotor blade repair method according to a twelfth invention for solving the aforementioned problems is the turbine rotor blade repair method according to the sixth invention, characterized in that the fin of the turbine rotor blade is a flat fin.

A turbine rotor blade repair method according to a thirteenth invention for solving the aforementioned problems is the turbine rotor blade repair method according to the seventh invention, characterized in that the fin of the turbine rotor blade is a flat fin.

Effects of the Invention

The turbine rotor blade repair method according to the first invention is a turbine rotor blade repair method for repairing damage of a fin at a tip of a turbine rotor blade which includes overlaying a damaged portion of the fin with metal by welding; peening a boundary region between the fin and the overlaying metal; and after the peening, performing solution treatment to repair the damage of the fin of the turbine rotor blade. Thus, compressive residual stresses are produced in the boundary region between the fin and the overlaying metal, and the tensile residual stresses produced in the boundary region are reduced. As a result, the occurrence of cracks at the boundary region between the fin and the overlaying metal is reduced. Accordingly, the occurrence of cracks due to welding is reduced.

With the use of the turbine rotor blade repair method according to the second invention, since the peening is performed with a peening hammer, this treatment itself is easy, and therefore only the boundary region between the fin and the overlaying metal can be appropriately treated. Specifically, sufficient treatment can be performed without masking blade surfaces and blade roots and easing conditions with consideration given to influences on the blade surfaces and the blade roots. Thus, compressive residual stresses can be appropriately produced in this boundary region to reliably reduce tensile residual stresses in the boundary region. As a result, the occurrence of cracks at the boundary region between the fin and the overlaying metal can be reliably reduced.

With the use of the turbine rotor blade repair method according to the third invention, since the peening is performed in both the side portions of the boundary region between the fin and the overlaying metal, treatment time is reduced, and the increase in the treatment cost is reduced.

With the above-described peening, the risk of occurrence of cracks is considerably reduced. However, since rotor blade material is usually made by casting, the segregation of trace elements in the grain boundary, the precipitation state of the aforementioned carbides, and the like seem to differ between positions in the grain boundary. Thus, the probability of occurrence of high-temperature cracks differs depending on the grain boundary. Accordingly, some grain boundary portions have very high crack sensitivity, and there may be cases where very small cracks cannot be completely prevented by peening.

In the turbine rotor blade repair method according to the fourth or fifth invention, after the solution treatment is performed on the boundary region between the fin and the overlaying metal, removing machining is performed to remove part of the boundary region. With the use of this turbine rotor blade repair method, even in the case where there are small cracks on the boundary region between the fin and the overlaying metal, very small bumps and dips produced by peening, very small altered layers produced by deformation processing, and the like, all of them are removed. As a result, the occurrence of damage caused by such small cracks, bumps and dips, altered layers, and the like is reduced.

With the use of the turbine rotor blade repair method according to the sixth or seventh invention, since the removing machining is electro-discharge machining, the removing machining can be reliably performed. Even in the case where there are small cracks, bumps and dips, altered layers, and the like in the boundary region between the fin and the overlaying metal, such small cracks, bumps and dips, altered layers, and the like are more reliably removed. As a result, the occurrence of cracks caused by such small cracks, bumps and dips, altered layers, and the like is more reliably reduced.

With the use of the turbine rotor blade repair method according to the eighth, ninth, tenth, eleventh, twelfth, or thirteenth invention, since the fin of the turbine rotor blade is a flat fin, the peening can be reliably performed. Accordingly, compressive residual stresses can be reliably produced in the boundary region between the fin and the overlaying metal. As a result, the tensile residual stresses produced during the welding can be more reliably reduced. Thus, the occurrence of cracks related to welding can be more reliably reduced.

BRIEF DESCRIPTION OF THE DRAWINGS

FIG. 4 is a flowchart of a second embodiment of the turbine rotor blade repair method according to the present invention.

FIGS. 5(a) and 5(b) are views for explaining machining for removing and forming of the second embodiment of the turbine rotor blade repair method according to the present invention.

FIGS. 8(a) and 8(b) are views for explaining a boundary region produced by overlay welding of the conventional turbine rotor blade repair method.

FIG. 9 is a graph showing a temperature history during heat treatment in the conventional turbine rotor blade repair method.

FIGS. 10(a) and 10(b) are views for explaining a boundary region produced by overlay welding of the conventional turbine rotor blade repair method.

Figure 1:
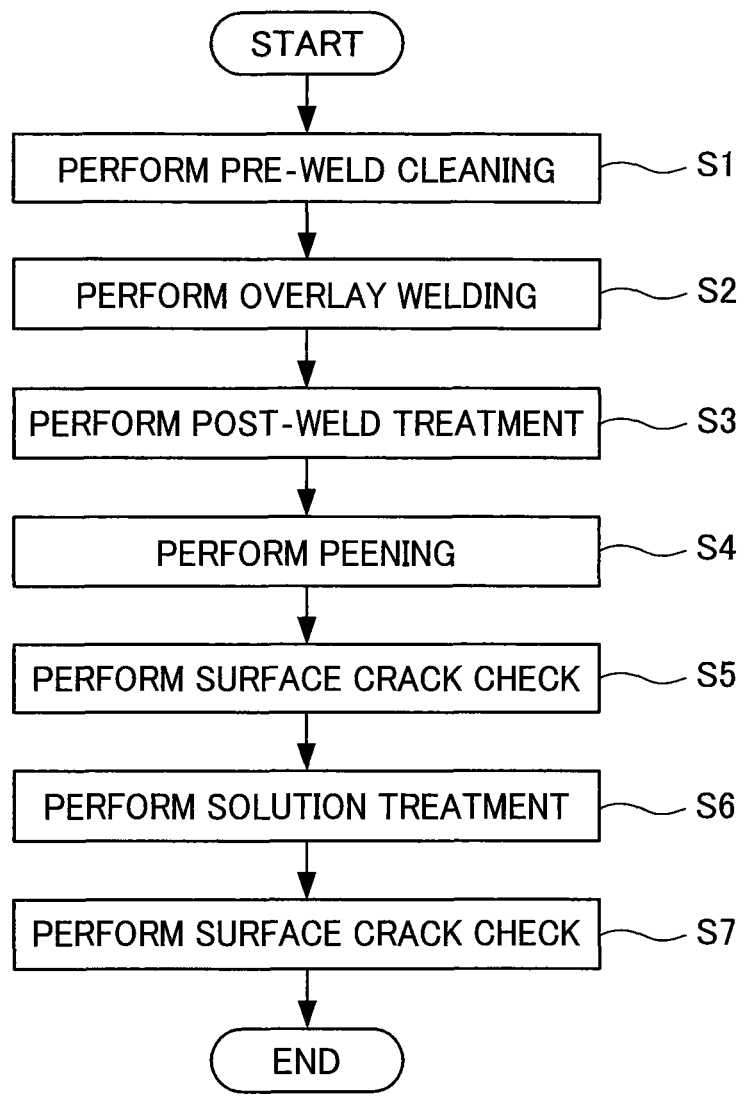
FIG. 1 is a flowchart of a first embodiment of a turbine rotor blade repair method according to the present invention.

EXPLANATION OF REFERENCE NUMERALS 10, 30 GAS TURBINE ROTOR BLADE; 11 BLADE PORTION; 11a TIP; 12 FIN; 13 BASE MATERIAL; 14 WELD METAL; 15 HEAT-AFFECTED ZONE; 16 PEENING; 31 NEW FIN PORTION; S2 OVERLAY WELDING; S4 PEENING; S11 MACHINING FOR REMOVING AND FORMING

BEST MODE FOR CARRYING OUT THE INVENTION

Embodiments of a turbine rotor blade repair method according to the present invention will be described below.

First Embodiment

Figure 2:
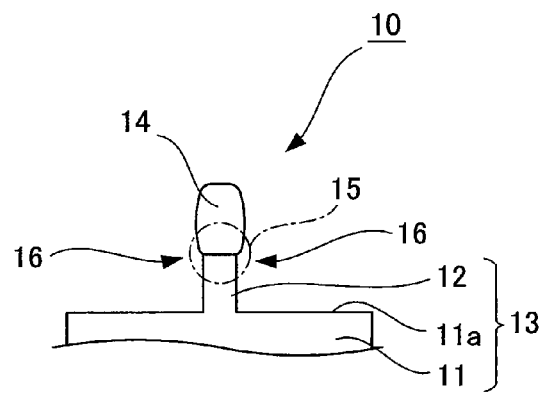
FIG. 2 is a view for explaining peening of the first embodiment of the turbine rotor blade repair method according to the present invention.
Figures 3A, 3B, 3C:
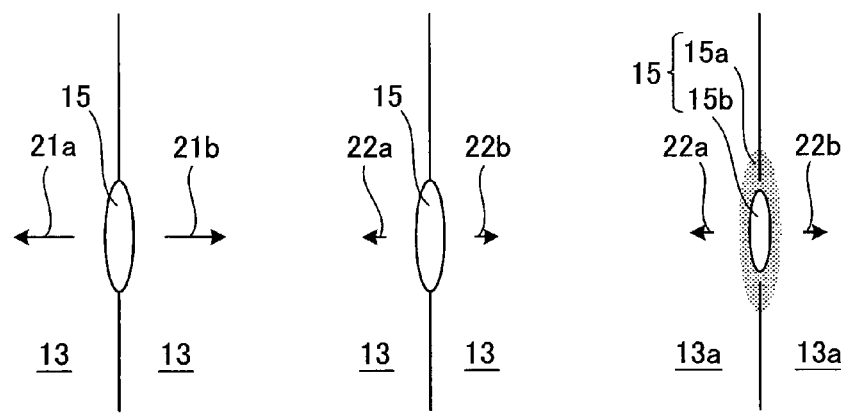
FIGS. 3(a) to 3(c) are views for explaining a boundary region produced by overlay welding of the first embodiment of the turbine rotor blade repair method according to the present invention.
Figure 6:
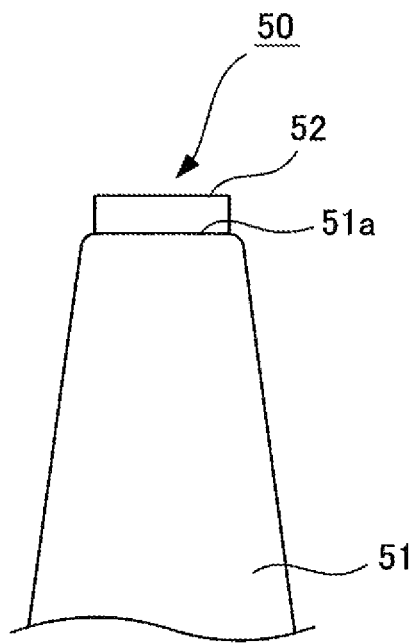
FIG. 6 is a view showing one example of a turbine rotor blade.
Figure 7:
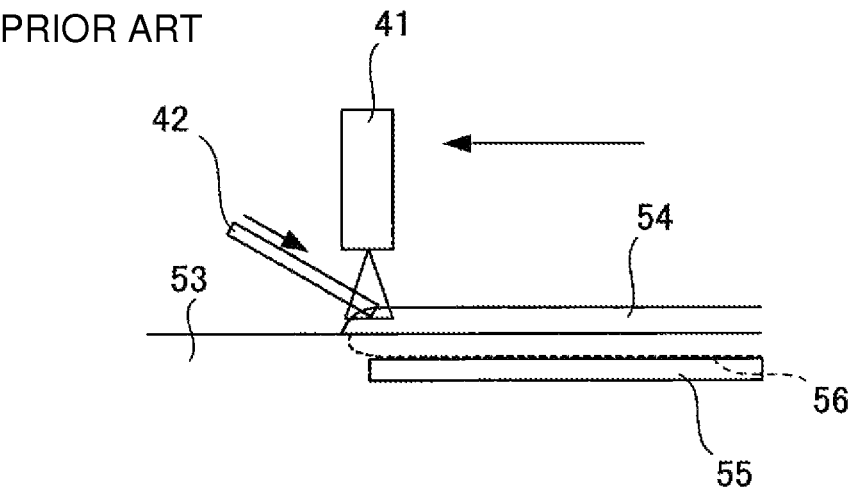
FIG. 7 is a view for explaining a conventional turbine rotor blade repair method.

A first embodiment in which the turbine rotor blade repair method according to the present invention is applied to a repair of a flat fin of a gas turbine rotor blade will be described with reference to FIGS. 1 to 3. FIG. 1 is a flowchart of the turbine rotor blade repair method. FIG. 2 is a view for explaining peening. FIGS. 3(a) to 3(c) are views for explaining a boundary region produced by overlay welding. It should be noted that in FIGS. 3(a) to 3(c), the lengths of arrows indicate the magnitudes of tensile residual stresses.

In the turbine rotor blade repair method according to this embodiment, as shown in FIG. 1, pre-weld cleaning is performed on the gas turbine rotor blade first (step S1). For example, foreign substances, brazing material, coating material, and the like adhering to the vicinity of a welded portion are removed. This reduces the occurrence of welding failure. Further, a jig dedicated for welding is attached to the fin. Then, in step S2, overlay welding is performed. Specifically, the fin of the gas turbine rotor blade is overlaid with weld metal by welding. Possible welding methods include, for example, microplasma welding and the like, but other alternate technique may also be employed such as tungsten inert gas (TIG) welding or laser welding. At this time, as shown in FIG. 3(a), tensile residual stresses 21a and 21b toward a base metal 13 side and a weld metal side occur in a heat-affected zone (containing a low-melting-point compound formed by eutectic reaction between metal carbide and the base metal) 15 affected by the heat of the overlay welding.

Subsequently, in step S3, post-weld treatment is performed. Specifically, a tab and the dedicated jig are removed, and treatment is performed on the portion (heat-affected zone) affected by the heat of the overlay welding.

Then, in step S4, peening is performed. The peening is performed by a peening hammer. As shown in FIG. 2, this treatment is performed on both side portions of the heat-affected zone 15 affected by the heat of the overlay welding. Thus, compressive residual stresses are produced in the boundary region between the fin and the overlaying metal. Accordingly, as shown in FIG. 3(b), tensile residual stresses 22a and 22b in the boundary region between the fin and the overlaying metal are reduced compared to the tensile residual stresses 21a and 21b produced during welding.

After that, in step S5, a surface crack check is performed on the gas turbine rotor blade. This surface crack check may be, for example, a check using fluorescent penetrant inspection method. This check is performed to determine the presence or absence of surface cracks in the gas turbine rotor blade.

Then, in step S6, solution treatment is performed on the gas turbine rotor blade. At this time, as shown in FIG. 3(c), grain boundary precipitates such as described previously form an eutectic with the base metal in part of a region near the periphery of the heat-affected zone 15, thus producing a liquefied region 15a. On the other hand, a central portion of the heat-affected zone 15 is a region 15b where the aforementioned precipitates are unreacted. The tensile residual stresses 22a and 22b in the heat-affected zone 15 at this time have the same magnitudes as the tensile residual stresses 22a and 22b resulting from the peening operation, and are smaller than tensile stresses needed to open the liquefied region, thus not causing cracks. Without the peening, large tensile stresses remain at this time to cause cracks in a liquid grain boundary. In the peened material, cracks do not occur in the early stages of heating. In the course of time, the material becomes relaxed by high temperature, and residual stresses are completely removed. Thus, the risk of cracks is eliminated. During cooling, a gamma prime phase is precipitated to strengthen the inside of the grains and cause tension in the grain boundary. It should be noted, however, that in the case of heat treatment, since the entire blade is heated and cooled unlike in a cooling process after welding, local thermal stresses are less prone to occur. The possibility that the tension caused by γ' precipitation may solely cause liquation cracking during the cooling seems to be lower than the possibility that liquation cracking may occur during welding. In other words, appropriate peening and tensile residual stress reduction before heat treatment can prevent cracks from occurring in a heating process before residual stresses are eliminated.

Subsequently, in step S7, a surface crack check is performed on the gas turbine rotor blade, and the repair is finished. This surface crack check of the gas turbine rotor blade in step S7 is similar to the aforementioned surface crack check of the gas turbine rotor blade in step S5. This check is performed to determine the presence or absence of surface cracks in the gas turbine rotor blade after solution treatment.

With the use of the above-described turbine rotor blade repair method, after a damaged portion of the fin is overlaid with metal by welding, peening is performed on the boundary region between the fin and the overlaying metal to produce compressive residual stresses in the boundary region, thus reducing the tensile residual stresses produced in the boundary region. As a result, the occurrence of cracks at the boundary region between the fin and the overlaying metal is reduced. Accordingly, the occurrence of cracks due to welding is reduced.

Since the peening is performed with a peening hammer, this treatment itself is easy, and therefore only the boundary region between the fin and the overlaying metal can be appropriately treated. Thus, compressive residual stresses can be appropriately produced in this boundary region to reliably reduce tensile residual stresses in the boundary region. As a result, the occurrence of cracks at the boundary region between the fin and the overlaying metal can be reliably reduced.

Since the peening is performed in both the side portions of the boundary region between the fin and the overlaying metal, treatment time is reduced, and the increase in the treatment cost is reduced.

Since the fin of the gas turbine rotor blade is a flat fin, the peening can be reliably performed. In particular, in the case where the peening is performed with a peening hammer, this peening can be reliably performed. Accordingly, compressive residual stresses can be reliably produced in the boundary region between the fin and the overlaying metal. As a result, the tensile residual stresses produced during the welding can be more reliably reduced. Accordingly, the occurrence of cracks due to welding failure can be more reliably reduced.

It should be noted that though the above description has been made as to an application to a repair of a fin of a gas turbine rotor blade, an application to a repair of a fin of a turbine rotor blade of a turbine other than a gas turbine is also possible. In the case of an application to a repair of a fin of a turbine rotor blade, functions and effects such as in the case of an application to a fin of a gas turbine rotor blade can be achieved.

Second Embodiment

A second embodiment in which the turbine rotor blade repair method according to the present invention is applied to a repair of a fin of a gas turbine rotor blade will be described with reference to FIGS. 4 to 5(b). FIG. 4 is a flowchart of the turbine rotor blade repair method. FIGS. 5(a) and 5(b) are views for explaining machining for removing and forming.

In the turbine rotor blade repair method according to the second embodiment of the present invention, additional treatments are added to the above-described turbine rotor blade repair method according to the first embodiment of the present invention after the surface crack check in step S7, and other procedures are the same as in the first embodiment. In the turbine rotor blade repair method according to the second embodiment of the present invention, the same procedures are denoted by the same reference numerals as in the above-described turbine rotor blade repair method according to the first embodiment of the present invention, and will not be further described.

In the turbine rotor blade repair method according to the second embodiment of the present invention, as shown in FIG. 4, after a surface crack check is performed on a gas turbine rotor blade in step S7, machining for removing and forming is performed in step S11. This machining for removing and forming may be electro-discharge machining, cutting with a grinder, or the like. Specifically, as shown in FIGS. 5(a) and 5(b), part of the surface of the heat-affected zone 15 is removed by electro-discharge machining to form a new fin portion 31. With this machining, even in the case where there are small cracks, bumps and dips produced by peening, altered layers produced by deformation processing, and the like on the surface of the heat-affected zone 15, which is the boundary region between the fin and the overlaying metal, such small cracks, bumps and dips, altered layers, and the like are removed. As a result, the occurrence of cracks caused by such small cracks, bumps and dips, altered layers, and the like is reduced. The thickness of the new fin portion 31 is smaller than the original fin thickness by the removed thickness, but there is no problem with the sealing performance.

Subsequently, in step S12, post-machining treatment is performed. Specifically, treatment is performed to smooth the seam between the new fin portion 31 and the base metal 13. Subsequently, in step S13, a surface crack check is performed on the gas turbine rotor blade, and the repair is finished. This surface crack check of the gas turbine rotor blade is similar to the aforementioned surface crack check of the gas turbine rotor blade in steps S5 and S7. This check is performed to determine the presence or absence of surface cracks in the gas turbine rotor blade.

The above-described turbine rotor blade repair method has functions and effects similar to those of the aforementioned turbine rotor blade repair method according to the first embodiment. Also, with the use of the above-described turbine rotor blade repair method, since the machining S11 for removing and forming is performed after the solution treatment S6, even in the case where there are small cracks, bumps and dips produced by peening, altered layers, and the like on the surface of the heat-affected zone 15, which is the boundary region between the fin and the overlaying metal, such small cracks, bumps and dips, altered layers, and the like are removed. As a result, the occurrence of cracks caused by such small cracks, bumps and dips, altered layers, and the like is reduced.

Further, since the machining for removing and forming is electro-discharge machining, the machining for removing and forming can be reliably performed. Even in the case where there are small cracks, bumps and dips, altered layers, and the like on the surface of the boundary region between the fin and the overlaying metal, such small cracks, bumps and dips, altered layers, and the like are more reliably removed. As a result, the occurrence of cracks caused by such small cracks, bumps and dips, altered layers, and the like is more reliably reduced.

The invention claimed is:

1. A turbine rotor blade repair method for repairing damage of a fin at a tip of a turbine rotor blade, characterized by comprising:
    overlaying a damaged portion of the fin with metal by welding where the heat from welding producing tensile residual stresses in a boundary region between the fin and the overlaying metal;
    peening the boundary region between the fin and the overlaying metal to produce compressive residual stresses in the boundary region so as to reduce the tensile residual stresses produced in the boundary region produced during the welding; and thereafter
    performing solution treatment to repair the damage of the fin of the turbine rotor blade by heating the turbine rotor blade to a temperature higher than the liquefaction temperature of the boundary region between the fin and the overlaying metal and lower than the melting point of the overlaying metal so as to maintain the magnitude of the tensile residual stresses in the boundary region at the same magnitude as the magnitude of the tensile residual stresses resulting from the peening,
    wherein the peening is performed on both side portions of the boundary region between the fin and the overlaying metal.

2. The turbine rotor blade repair method according to claim 1, characterized in that the peening is performed by a peening hammer.

3. The turbine rotor blade repair method according to any one of claims 1 and 2, characterized in that after the solution treatment is performed on the boundary region between the fin and the overlaying metal, removing machining is performed to remove part of the boundary region.

4. The turbine rotor blade repair method according to claim 3, characterized in that the removing machining is electro-discharge machining.

5. The turbine rotor blade repair method according to claim 3, characterized in that the removing machining is electro-discharge machining.

6. The turbine rotor blade repair method according to any one of claims 1 and 2, characterized in that the fin of the turbine rotor blade is a flat fin.

7. The turbine rotor blade repair method according to claim 3, characterized in that the fin of the turbine rotor blade is a flat fin.

8. The turbine rotor blade repair method according to claim 1, characterized in that the fin of the turbine rotor blade is a flat fin.

9. The turbine rotor blade repair method according to claim 4, characterized in that the fin of the turbine rotor blade is a flat fin.

10. The turbine rotor blade repair method according to claim 5, characterized in that the fin of the turbine rotor blade is a flat fin.

* * * * *